United States Patent [19]

Wang

[11] Patent Number: 4,904,203
[45] Date of Patent: Feb. 27, 1990

[54] DEVICE FOR CONNECTING A WIRE TO A MOTOR TERMINAL

[75] Inventor: Patrick S. Wang, Hong Kong, Hong Kong

[73] Assignee: Johnson Electric Industrial Manufactory, Limited, Chaiwan, Hong Kong

[21] Appl. No.: 179,233

[22] Filed: Apr. 8, 1988

[30] Foreign Application Priority Data

Apr. 13, 1987 [GB] United Kingdom ................ 8708786

[51] Int. Cl.⁴ ............................................. H01R 4/24
[52] U.S. Cl. .................... 439/399; 439/401; 439/397; 439/417
[58] Field of Search ............... 439/395, 398, 399, 400, 439/401, 404, 397, 402, 403, 865, 867, 868, 417–419

[56] References Cited

U.S. PATENT DOCUMENTS

| | | | |
|---|---|---|---|
| 2,694,189 | 11/1954 | Wirsching | 439/399 |
| 3,016,510 | 1/1962 | Blonder | 439/411 |
| 3,083,349 | 3/1963 | Blonder | 439/413 |
| 3,257,635 | 6/1966 | Cobaugh | 439/865 |
| 3,350,679 | 10/1967 | Marley et al. | 459/865 |
| 3,391,379 | 7/1968 | Smotherman | 439/412 |
| 3,760,339 | 9/1973 | Marshall . | |
| 4,118,091 | 10/1978 | Frisby | 439/401 |
| 4,220,390 | 9/1980 | Cobaugh et al. | 439/401 |
| 4,256,360 | 3/1981 | Debaight | 439/399 |
| 4,740,171 | 4/1988 | Holden et al. | 439/410 |

FOREIGN PATENT DOCUMENTS

| | | |
|---|---|---|
| 1497629 | 1/1978 | United Kingdom . |
| 1528556 | 10/1978 | United Kingdom . |
| 2008866 | 6/1979 | United Kingdom . |
| 2022939 | 12/1979 | United Kingdom . |
| 1563267 | 3/1980 | United Kingdom . |
| 1584909 | 2/1981 | United Kingdom . |

Primary Examiner—David Pirlot
Attorney, Agent, or Firm—Fleit, Jacobson, Cohn, Price, Holman & Stern

[57] ABSTRACT

A device for connecting a wire to a terminal of an electric motor comprises a planar portion having means for gripping a terminal. A slot is formed in the planar portion and straddles and grips a core of the wire, thus electrically connecting the wire to the terminal. The wire is held between a support and a clamping portion on the device.

18 Claims, 3 Drawing Sheets

DEVICE FOR CONNECTING A WIRE TO A MOTOR TERMINAL

This invention relates to an electric motor having a device for connecting a wire to a motor terminal.

BACKGROUND

Conventionally, wires are connected to terminals of fractional horsepower electric motors, by soldering. The connection process is time consuming and moreover, a bared part of the wire adjacent to the soldered connection remains unsupported and is able to move about when subjected to vibration. This can lead to loosening of the joint.

SUMMARY OF THE INVENTION

According to the invention, there is provided an electric motor comprising a terminal for electrical connection to a power supply, a wire support adjacent to the terminal, and a device for electrically connecting a wire to the terminal, the device being adapted to slidably connect with the terminal and having a slot for straddling and gripping a wire, supported by the wire support, as the device is connected to the terminal to make electrical contact with the wire.

Other preferred features and advantages of the invention will be apparent from the following description and the accompanying claims.

DESCRIPTION OF PREFERRED EMBODIMENTS

Figure 1:
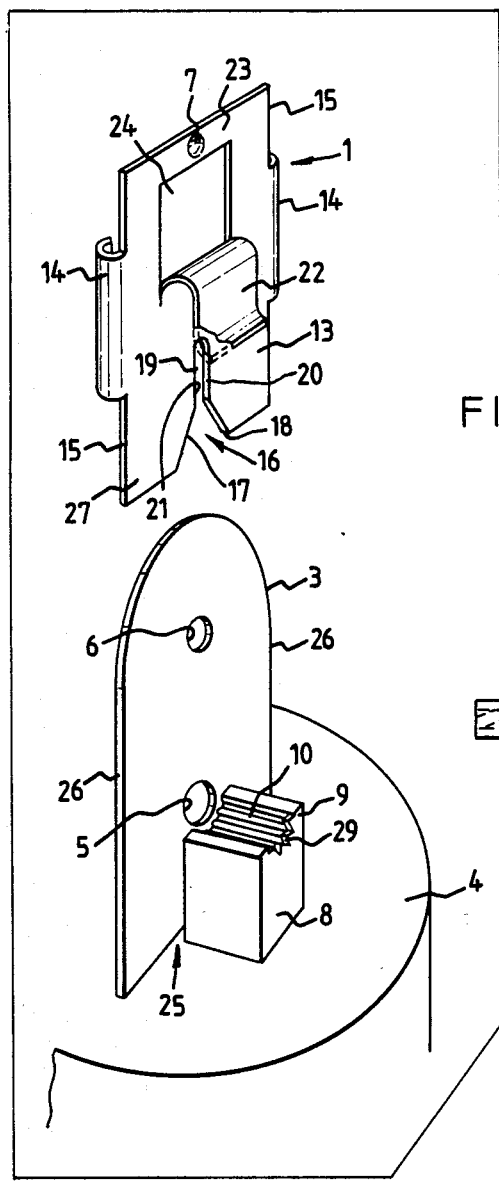
FIG. 1 is an exploded view of a part of a motor according to the invention.

FIG. 1 shows a first embodiment of the invention. A device 1 is arranged to grip and to electrically connect a wire 2 with a terminal 3 which protrudes from an end cap 4 of an electric motor. Typically terminal 3 will be in electrical connection with a brush inside the motor for supplying current to armature coils of the motor via a commutator. The invention is equally applicable to DC motors, AC motors and universal motors, but finds particular utility with fractional horsepower PMDC motors where component parts are small and space is often at a premium when installing such motors in appliances.

Terminal 3 is a flat, metal, spade terminal having a first aperture 5 through which wire 2 may pass, and a second aperture 6 for cooperation with a dimple 7 on the device 1.

The terminal 3 protrudes through a plastics end cap 4. Adjacent the terminal 3 and spaced therefrom is a wire support 8. Support 8 is integrally moulded with the end cap 4 and has a bifurcated end 9 forming a groove 10 which is arranged to support the wire 2. The groove 10 has a ribbed inner surface and a serrated edge 29.

Wire 2 has a plastics coating 11 about a conducting stranded core 12 as is well known in the art.

Device 1 is stamped and folded from sheet metal and comprises a planar portion 13 which has gripping portions 14 formed on opposite edges 15 by rolling over the material of the planar portion, as is well known in the connector art.

Formed in a lower end 27 of the planar portion 13 is a slot 16. Slot 16 has a widened V-shaped portion 17 which at its lower end 18 is wider than the outer diameter of wire 2.

The V-shaped portion 17 tapers upwardly into a parallel sided slot portion 19 which is narrower than the diameter of the stranded core 12 of wire 2. The facing surfaces 20, 21 of the slot 16 are sharp, or they may carry a barb, so as to penetrate the plastics sleeve 11 on the wire 2 as the slot 16 is slid over the wire, as will be described more fully hereinafter.

A clamping portion 22 is pressed out of the planar portion 13 and depends downwardly in a generally S-shape.

A dimple 7 is pressed in the upper end 23 of the planar portion above an aperture 24 left by the pressed out clamping portion 22.

To connect electrically the wire 2 to the terminal 3 by means of the device 1, the wire is laid on the support 8 with an end of the wire projecting across the gap 25 between the support 8 and terminal 3. It is preferable that the wire project into or through the aperture 5 so that it is supported on either side of the gap 25. The device 1 is then slid downwards over the terminal 3. The rolled gripping portions 14 are opened out slightly as they contact edges 26 of the terminal to enfold the edges and so grip the terminal as is well known in the connector art. The lower end 27 slides into the gap 25. The slot 16 is dimensioned so that the V-shaped portion 17 will ride over the wire 2, the wire being squeezed as the narrow end of the slot bears down on the wire, the wire being squeezed eventually into the parallel sided slot portion 19.

As mentioned previously the opposed surfaces 20, 21 may be sharp or barbed so as to penetrate the wire sleeve 11 so that the slot edges make physical and hence electrical contact with the wire core 12.

It is not necessary for the slot edges to be sharp or barbed. The wire casing may be stripped from the wire in the region to be gripped by the device 1, before the wire is laid on the support 8.

Figure 2:
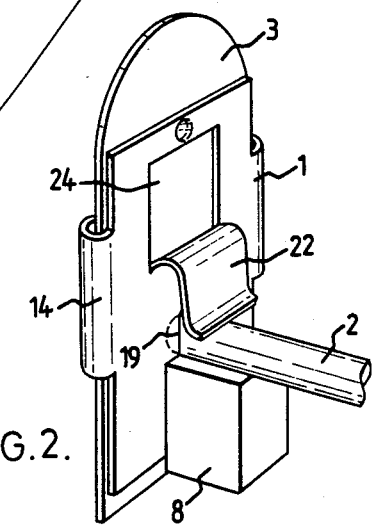
FIG. 2 shows the arrangement of FIG. 1 assembled.

As the device is slid home the clamping portion 22 bears down on the wire to press it into the groove 10, to prevent sideways movement of the wire in the region of the slot 16, which may otherwise cause the wire to free and perhaps break (see FIG. 2). The serrated edge 29 of the groove 10 also serves to prevent longitudinal movement of the wire.

The dimple 7 (on the rear of planar portion 13 as seen in FIG. 1) cooperates with the aperture 6 to hold the device 1 on the terminal 3.

Figure 3:
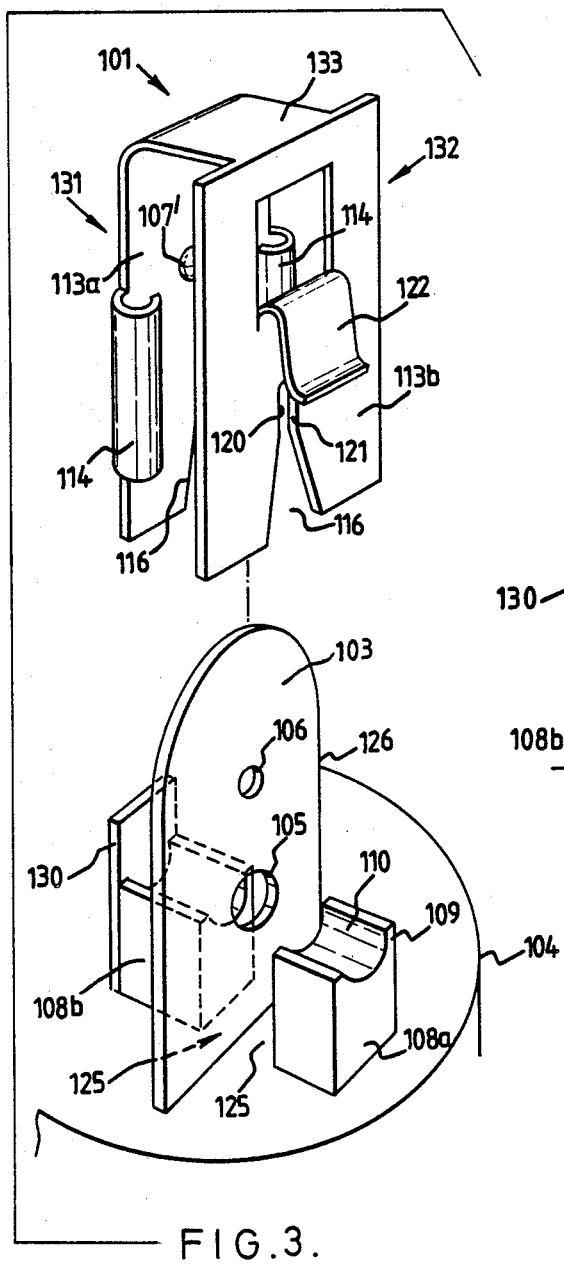
FIG. 3 shows a second embodiment of the invention as for FIG. 1.

In FIG. 3, like parts to those of the embodiment of FIG. 1 are given like reference numerals, with the addition of 100.

In the arrangement of FIG. 3, two supports 108a, 108b are provided either side of the terminal 103, the wire 102 (see FIG. 4) being laid through the aperture 105 and supported on each side by the supports 108a, 108b. A stop plate 130 is provided by support 108b to limit the insertion of the wire 2 through the aperture 105.

The device 101 is in first and second parts 131, 132 which are integrally connected by a plate portion 133. First part 131 comprises planar portion 113a with a dimple 107; rolled gripping portions 114 and a slot 116. The second part 132 comprises a second planar portion 113b with a slot 116 and clamping portion 122. The device 101 may be formed by stamping and folding from metal sheet.

Figure 4:
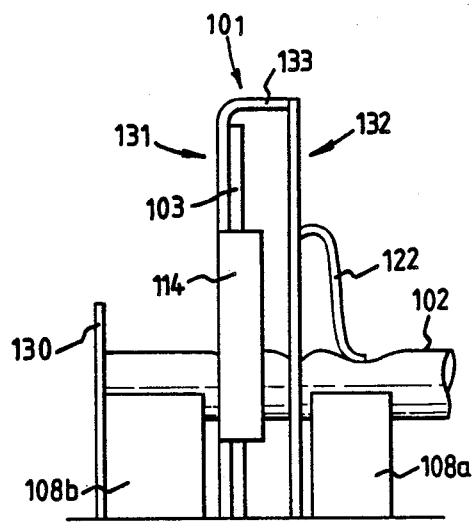
FIG. 4 shows the arrangement of FIG. 3 assembled.

In operation the device 101 is slid over the terminal 103, the terminal lying between the planar portions 113a, 113b (see FIG. 4). As before the slots 116 straddle and grip the wire 102, with clamping portion 122 bearing down on the wire 102 to press it into the groove 110 in support 108a. The wire 102 (not shown) may be pre-stripped, the facing surfaces 120, 121 of the grooves 116 being flat to grip the wire strands 112 without cutting.

Figure 5:
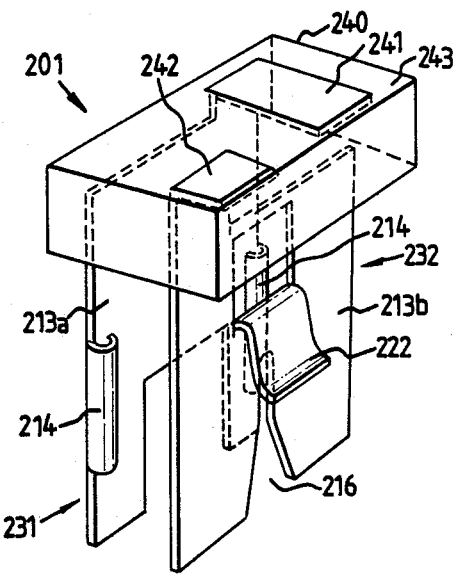
FIG. 5 shows a third embodiment of the invention.

In FIG. 5 like parts are given like reference numerals to those of FIG. 1 with the addition of 200. FIG. 5 shows a third embodiment of the device 201. The device 201 comprises first and second parts 231, 232 comprising a first planar portion 213a having rolled gripping portion 214, and a second planar portion 213b having a slot 216 and clamping portion 222. The first and second parts are electrically separated and joined by a plastics cap 240, upper ends of the planar portions being embedded in the cap 240. At the upper end of each planar portion a contact portion 241, 242 is provided, the contact portions being exposed on the top 243 of the cap 240.

Figure 6:
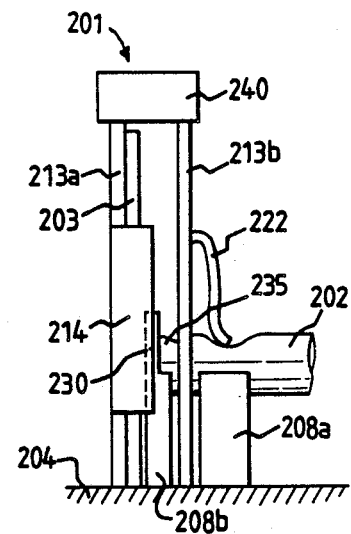
FIG. 6 shows the device of FIG. 5 mounted on a terminal.

On the end cap 204 (FIG. 6) two spaced apart plastics supports 208a, 208b are provided to one side of the terminal 203. A stop 230 is formed on one support 208a adjacent the terminal 203. A stripped wire 202 is laid on the supports, its end 235 abutting the stop 230 so as to be electrically insulated from the terminal 203.

The device 201 is slid onto the terminal 203, the first part 231 gripping the terminal 203 and the second part 232 straddling and gripping the wire 202, planar portion 213b sliding between the supports 208a, 208b and clamping portion 222 clamping the wire 202 into the groove 210b.

To complete the electrical connection between the wire 202 and terminal 203 a conducting bridge, such as a metal finger, is placed across the exposed portions 241, 242. The finger may be part of a switch mechanism for the motor, and/or may be an electrical component such as a suppression element, choke, varistor etc.

The exposed parts 241, 242 may be housed in a cavity in the plastics holder 240, for receiving a terminal, or terminals of a connector or electrical device.

Figure 7:
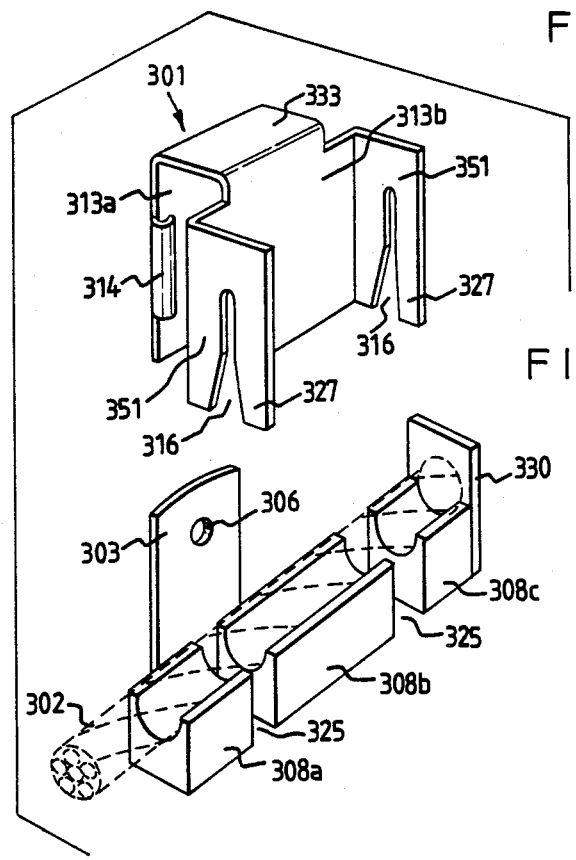
FIG. 7 shows a fourth embodiment of the invention as for FIG. 1.

In FIG. 7 like parts to those of FIG. 1 are given like reference numerals with the addition of 300.

A support 308 for the wire 302 comprises three portions 308a, b, c, laid in a line parallel to the plane of the terminal 303, with a stop 330 on one portion 308c.

Device 301 comprises a first planar portion 313a with rolled gripping portions 314 and a second integrally connected planar portion 313b. Two slot containing portions 351 project out of the plane of portion 313b and each has a slot 316 in its lower end 327.

The first portion 313a is slid onto the terminal 303 as before and the slot containing portions 351 slide into the gaps 325 between the wire supports 308a, b, c, slots 316 straddling and gripping the wire 302, as before the slots may grip a bared wire 302 or be formed so as to penetrate a sleeve of the wire.

This embodiment is also suitable for use with separate first and second parts or planar portions 313a, 313b as in FIG. 5, integral connecting plate 333 being replaced by a plastics holder (243) to allow the incorporation of a switch mechanism or electrical component.

A pair of devices 1, 101, 201, 301 may be mounted in an insulating cap which is arranged to fit over an end of the motor for simultaneous connection of wires to respective terminals.

The arrangement of FIG. 7 allows the wires to project from the same side of the motor assembly.

The device is particularly suitable for use with pre-tinned stranded wire which is treated to melt the solder into a coherent cylindrical mass suitable for gripping by the slot edges.

Various modifications may be made and it is desired to include all such modifications as fall within the scope of the accompanying claims.

What is claimed is:

1. In an electric motor having a terminal for electrical connection to a wire of a power supply for the motor, the terminal projecting from a generally planar surface of an end cap of the motor, the improvement comprising a support on the motor, the support being spaced from and separate to the terminal for supporting said wire above said surface so that said wire is spaced from said surface, said terminal having an aperture and said wire support having a groove both for receiving said wire, and said groove and said aperture are aligned for enabling said wire to lie in said groove and to project through said aperture; and a connecting device formed separately to the terminal and wire support, the connecting device including means for slidably connecting the connecting device to the motor terminal to make an electrical connection therewith and including means in the form of a slot for straddling and gripping said wire supported by the wire support to make an electrical connection with the wire as the connecting device is slidably connected with the terminal.

2. An electric motor as claimed in claim 1, wherein said slot is formed in a planar portion of said connecting device and said planar portion is positioned between said terminal and said wire support to grip said wire.

3. An electric motor as claimed in claim 1, wherein two said wire supports are provided, said wire supports being positioned on opposite sides of said terminal.

4. An electric motor as claimed in claim 1, wherein said connecting device comprises a first generally planar portion which slidably connects with and lays flat against said terminal, and a second generally planar portion which includes said slot and is spaced from said first generally planar portion.

5. An electric motor as claimed in claim 4, wherein a protuberance is provided on said first portion and an aperture is provided in said terminal, said protuberance engaging in said aperture to secure the connecting device on the terminal.

6. In an electric motor having a terminal for electrical connection to a wire of a power supply for the motor, the terminal projecting from a generally planar surface of an end cap of the motor, the improvement comprising a support on the motor, the support being spaced from and separate to the terminal for supporting said wire above said surface so that said wire is spaced from said surface; a connecting device formed separately to the terminal and wire support, the connecting device including means for slidably connecting the connecting device to the motor terminal to make an electrical connection therewith and including means in the form of a slot for straddling and gripping said wire supported by the wire support to make an electrical connection with the wire as the connecting device is slidably connected with the terminal; and a clamping portion provided on said connecting device and said clamping portion bearing on said wire in a region of said wire, said region of said wire being supported by said wire support to clamp said wire against said support.

7. An electric motor as claimed in claim 6, wherein a surface of said wire support supporting said wire is ribbed.

8. An electric motor as claimed in claim 6, wherein an inner edge of said slot has a cutting edge which cuts through insulation on the wire as the connecting device is slidingly connected to the terminal.

9. An electric motor comprising an end cap, a terminal projecting from said end cap for connection to a wire of a power supply for said motor, a wire support formed on said end cap adjacent to and separate from said terminal for supporting said wire in a position spaced from said end cap, said wire of said power supply being supported on said wire support, and a connecting device slidingly connected to said terminal to make electrical connection therewith, said connecting device including a slot which straddles and grips said wire in a first region near said support to make electrical contact with said wire and a clamping portion which bears on said wire in a second region which is supported by said support to clamp said wire against said support.

10. An electric motor as claimed in claim 9, wherein an aperture is provided in the terminal and said wire projects through said aperture, said slot straddling and gripping the wire in said first region between said terminal and said support.

11. An electric motor having a terminal projecting from an end cap of the motor for electrical connection to a wire of a power supply for the motor, a wire support on the end cap for supporting said wire of said power supply in a position spaced from the end cap, and a connecting device electrically connecting the terminal with the wire and securing the wire on the end cap, wherein the connecting device comprises a first planar portion which is slidably connected to the terminal, a second planar portion generally parallel to and spaced from the first portion and including a slot which straddles and grips the wire to make an electrical connection therewith, and a clamping portion for clamping the wire against the wire support.

12. An electric motor as claimed in claim 11, wherein the second portion is positioned between the wire support and the terminal.

13. An electric motor as claimed in claim 12, wherein the clamping portion is formed by a tongue which is pressed from the second planar portion.

14. An electric motor comprising a terminal for electrical connection to a power supply, a wire support adjacent to the terminal, and a device for electrically connecting a wire to the terminal, the device comprising a first part adapted to slidably connect with the terminal and a second part defining a slot for straddling and gripping a wire, supported by the wire support, as the device is connected to the terminal to make electrical contact with the wire, the first and second parts being connected by an electrically insulating support and each having an exposed portion, said exposed portions being arranged to be electrically joined.

15. An electric motor as claimed in claim 14, wherein an electrical component electrically joins the first and second parts.

16. An electric motor as claimed in claim 14, wherein the device includes a clamping portion which bears on said wire in a region which is supported by the support, thereby to clamp said wire against said support.

17. An electric motor having a terminal for electrical connection to a wire of a power supply for the motor, a support separate from the terminal for supporting said wire, and a connecting device formed separately from the wire support and the terminal, the connecting device including a first generally planar portion having means for connecting the device to the terminal, the planar portion laying against the terminal, and a second generally planar portion which is generally perpendicular to said first planar portion and which defines a slot for straddling and gripping said wire, said wire support comprising two spaced apart adjacent portions and said second planar terminal portion straddling and gripping said wire in a region between said wire support portions.

18. An electric motor as claimed in claim 17, wherein said connecting device includes two said second generally planar portions.

* * * * *